April 9, 1940.　　W. E. MERRIMAN　　2,196,736
SOUND STABILIZER
Filed Oct. 13, 1938
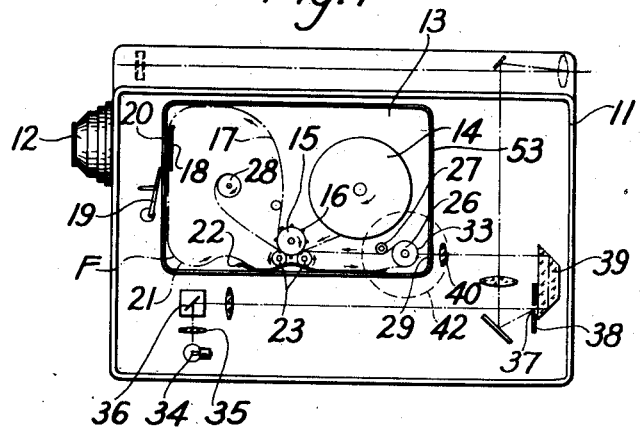
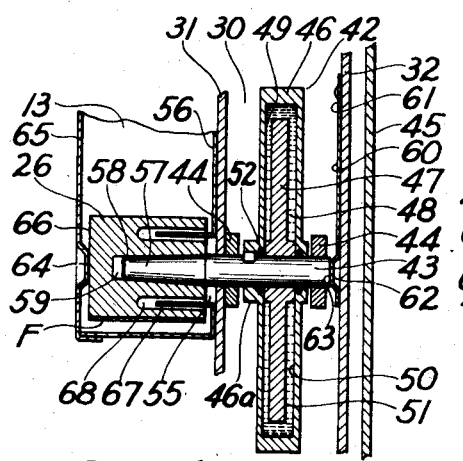
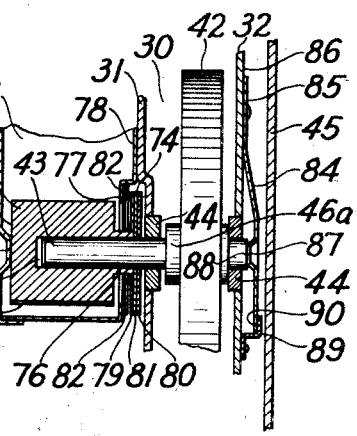
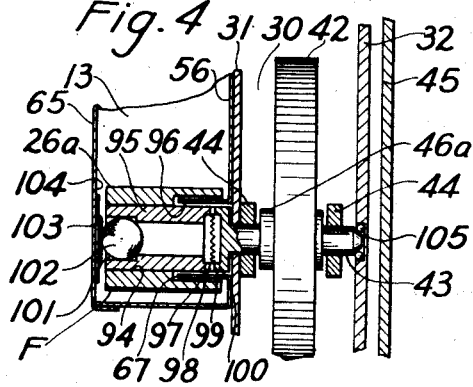
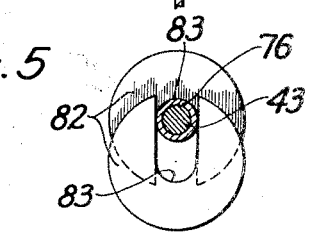
William E. Merriman
INVENTOR
BY
ATTORNEYS Patented Apr. 9, 1940

2,196,736

UNITED STATES PATENT OFFICE 2,196,736

SOUND STABILIZER

William E. Merriman, Rochester, N. Y., assignor to Eastman Kodak Company, Rochester, N. Y., a corporation of New Jersey Application October 13, 1938, Serial No. 234,809

12 Claims. (Cl. 88—16.2)

The present invention relates to a sound camera of the film magazine type in which a film strip is intermittently passed in front of a picture exposing aperture, and is then continuously passed in front of a sound exposing aperture which is spaced a definite distance from the picture aperture.

In order to secure a true reproduction on the film strip of the sound being recorded, it is highly essential that the film strip be moved at a substantially constant and uniform lineal speed past the sound recording aperture, and that the sound drum be spaced the proper distance from the objective lens of the sound optical system. As is well known, it is difficult and highly expensive to manufacture parts which are absolutely free from slight imperfections and/or eccentricities. These imperfections and eccentricities in the various film driving members together with any slight imperfection in the film strip itself may cause small momentary variations or fluctuations in the lineal speed of the film strip as the latter passes the sound aperture. Such variations, if not corrected, will obviously distort the sound record, the disadvantages of which are obvious to those in the art. In addition, in order to accurately record the higher sound frequencies on the film strip, the sound drum must not only be spaced the proper distance from the objective lens of the sound system, but this distance must be accurately maintained, irrespective of the position of the magazine in the camera. One object of the invention is the provision of a device for damping or filtering out any small momentary variations in the lineal speed of the film strip to insure that the latter will be fed at a uniform rate past the sound aperture.

Another object of the invention is the provision of a support for the sound drum which will not only support the latter in registry with the sound aperture, but will also maintain the film strip on the sound drum the proper distance from the sound objective lens.

A further object of the invention is the provision of a rotary stabilizer which automatically adjusts itself to compensate for minor variations in the feeding mechanism so as to insure a uniform film speed at the point of sound recording.

Yet another object of the invention is the provision of such a stabilizer which can be attached to existing cameras of the sound magazine type.

A further object of the invention is the provision of a stabilizer which is automatic in its operation and thus requires no attention on the part of the operator.

Still another object of the invention is the provision of a stabilizer of the class described which is inexpensive to manufacture, simple in construction, automatic in its operation, and highly desirable in its results.

To these and other ends, the invention resides in certain improvements and combinations of parts all as will be hereinafter more fully described, the novel features being pointed out in the claims at the end of the specification.

In the drawing:

Fig. 1 is a side view of a sound camera of the film magazine type with the side plate of the camera and the magazine cover removed, and with a portion of the magazine in section, showing the mechanism for moving the film strip through the magazine, and the relation thereto of a rotary stabilizer constructed in accordance with the preferred embodiment of the invention.

Fig. 2 is a fragmentary sectional view of a portion of the camera and magazine illustrated in Fig. 1, but on a larger scale than the latter, showing one method of operatively connecting the rotary stabilizer to the sound recording drum for maintaining a uniform film speed at the sound aperture; and for retaining the sound drum the proper distance from the objective lens of the sound optical system.

Fig. 3 is a view similar to Fig. 2, showing a modified arrangement for connecting the stabilizer to the sound drum.

Fig. 4 is a view similar to Figs. 2 and 3 showing a still further modification of connecting or clutching the stabilizer to the sound drum; and Fig. 5 is an end view of a portion of the mechanism illustrated in Fig. 3 showing the arrangement by which the opening in the film magazine is closed to afford the necessary light lock therefor.

Similar reference numerals throughout the various views indicate the same parts.

Fig. 1 of the drawing shows a sound camera formed with a case or housing 11 on the front of which the camera or picture objective lens 12 is mounted. A film magazine, generally indicated by the numeral 13, is placeable within the camera housing and contains a supply of film which is intermittently fed past a picture-exposing aperture to record the picture, and is then continuously fed past a sound aperture to record the sound image on the marginal edge of the film, all as will be hereinafter more fully explained. A definite length of film is maintained between the picture and sound apertures so as to maintain the proper synchronism between the picture taking and the sound recording, as is well known in the art.

The film magazine 13 contains a supply roll 14 of unexposed film. The film strip F is drawn from the roll 14 by a constantly driven sprocket 15, the teeth 16 of which engage the marginal perforations in the film strip to feed the latter to the upper supply film loop 17 and the film gate 18. A suitable pull-down mechanism 19 intermittently pulls or feeds the film strip through the gate 18 and past the picture-exposing aperture 20 where the film strip is exposed to the image formed by the picture objective lens 12. The strip F then passes downwardly to the lower film loop 21 formed by a spring 22 of the shape best shown in Fig. 1. This spring is so shaped as to also hold the moving film strip against a pair of rollers 23 positioned below the sprocket 15, as clearly shown in Fig. 1.

The strip F is then looped over a sound drum 26, to be later more fully described, and then under a guide roller 27 and finally between the sprocket 15 and the rollers 23 to the takeup roll 28, all as clearly shown in Fig. 1. As the strip F passes around the drum 26 a marginal edge of the strip passes across a sound aperture 29 for recording the sound image on the film strip. It is apparent from an inspection of Fig. 1, that as the sprocket 15 is driven the film strip F will be drawn over the drum 26 to rotate the latter, and to continuously feed the strip F past the sound aperture 29, the drums being arranged in a loop 33 of the strip F. The pulldown mechanism 19 on the other hand, intermittently feeds the strip F through the film gate 18 and past the picture aperture 20. The mechanism for driving the sprocket 15 and the pull-down 19 are positioned in a mechanism chamber 30 formed by the spaced walls 31 and 32 on the sides of the camera housing 11. An outer wall 45 of the camera housing is spaced from and secured to the wall 32 in any suitable and well-known manner.

In recording the sound, the image of a lamp filament 34 passes through a condensing lens 35 and is imaged on a galvanometer mirror 36 which is connected to the sound pick-up mechanism, not shown. The image on the galvanometer mirror 36 is reflected onto a light slit 37 formed in a plate 38. The portion of the sound image which passes through the slit 37 is reflected by means of a prism 39 and a sound objective lens 40 through the sound aperture 29 and onto the film strip F, all as well known to those in the art.

The above-described mechanisms, with the exception of the sound drum 26, may be of any suitable and well-known construction and do not constitute a part of the present invention.

It is well known in the art, that accurate and true reproduction of the sound can only be secured when the film strip is fed at a constant and uniform lineal speed past the sound aperture 29, and when the film strip, during its passage past the sound aperture, is maintained the proper distance from the sound objective lens 40. It is also well known, for the reasons pointed out above, that it is quite difficult, if not impossible, to provide an absolutely smooth uniform motion to the various feed mechanisms. Any slight momentary variations in the various feeding mechanisms will tend to correspondingly vary the speed of the sound drum 26, and hence the speed of the film strip F past the sound aperture 29, thus distorting the sound image, the disadvantages of which are obvious to those in the art.

In order to overcome these disadvantages, the present invention provides a rotary stabilizer, or viscous flywheel, generally indicated by the numeral 42. This stabilizer is mounted in the mechanism chamber 30 and is operatively connected to and driven by the sound drum 26, in a manner to be presently described. This stabilizer is arranged to automatically and mechanically dampen or filter out any slight momentary variations in the speed of the drum 26, thus insuring a smooth and substantially uniform speed of the film strip past the sound aperture 29. In addition the supporting means for the stabilizer engages the drum to support the latter substantially in registry with the sound aperture, as well as retaining the drum the proper distance from the lens 40. By means of such an arrangement a true, accurate recording of the sound is assured.

The stabilizer 42 is mounted on and supported by a shaft 43 which is slidable axially in bearings 44 in the chamber 30. This stabilizer, in the present embodiment, is in the form of a viscous fly-wheel and comprises an outer cylindrical member 46 formed with a hub 46a rigidly secured to and movable as a unit with a shaft 43, and a secondary cylindrical member 47 positioned within the outer member 46 and loosely mounted on a shaft 43, as clearly shown in Fig. 2. The space 48 between the members 46 and 47 is filled with a fluid 49, such as oil, which affords the sole driving connection between the two members 46 and 47. Suitable seals 52 are provided between the shaft 43 and the outer member 46. As the stabilizers 42 in Figs. 2, 3, and 4 are identical in construction the detailed showing thereof is made only in Fig. 2, the remaining figures merely showing the outside view of the complete stabilizer.

It is apparent from inspection of Fig. 2 that when the shaft 43 is rotated, the outer member 46 will also rotate as a unit therewith. When, however, the member 46 is thus rotated, the inner surfaces 50 thereof will frictionally engage the oil 49 and will provide, in effect, a slipping friction clutch between the member 46 and the oil 49 to gradually bring the latter, as a unit, up to the speed of the member 46. The rotating body of oil 49 will, in turn, frictionally engage the outer surface 51 of the inner member 47 to drive the latter. Finally the inner and outer members will rotate, as a unit, at the same angular speed.

However, should the speed of the shaft 43 momentarily increase, the speed of the outer member 46 will correspondingly increase. The inner member 47 and the oil 49, due to their inertia, will however tend to rotate at the same speed and will thus act as a brake on the outer member 46 to return the latter and the shaft 43 to their previous speeds. If, on the other hand, the shaft 43 tends to momentarily decrease in speed, the outer member 46 will thus tend to run slower than the inner member 47 and the oil 49. These latter members will then act as a driving member and will tend to bring the outer member 46 up to the speed of the inner member 47. Thus the inertia of the rotating member 47 and the body of oil 49 will tend to maintain the speed of the outer member 46, and hence the shaft 43, substantially constant and uniform. It is apparent, therefore, that such a stabilizer will effectively dampen or filter out any slight momentary variations in the speed of the shaft 43 and thus hold the speed of the latter substantially constant and uniform.

It is also apparent that if the shaft 43 is suitably connected to and driven from the drum 26, the stabilizer 42 will automatically adjust itself to compensate for any slight momentary variations in the lineal speed of the drum 26 caused by imperfections in the drive members or the film strip, as pointed out above. As the drum 26 is thus maintained at a substantially uniform speed, the film strip F will be fed past the sound aperture 29 at a uniform rate to provide an accurate recording of the sound image, the advantages of which are obvious to those in the art. In addition, the shaft 43 will support the drum 26 and will thus bring the horizontal axis thereof substantially in alignment with the sound aperture 29. But what is more important, the shaft 43 will accurately maintain the film strip F as it passes the aperture 29, the proper distance from the lens 40 irrespective of the position of the wall 53 of the magazine 13. In the various modifications, the shaft 43 and the stabilizer 42 are permanently mounted in the camera housing, and are automatically coupled or clutched to the sound drum 26 on placing or positioning the magazine 13 within the camera housing.

In the embodiment illustrated in Fig. 2, the left end of the shaft 43 extends through the wall 31 of the mechanism chamber 30 and through registering opening 55 formed in the side 56 of the magazine 13. The shaft is formed with a tapered portion 57 which is arranged to engage a correspondingly tapered periphery 58 of a central opening 59 of the drum 26. This engagement of the portion 57 with the periphery 58 forms, in effect, a friction clutch which affords a driving connection between the drum 26 and the shaft 43, as is apparent from an inspection of this figure.

A leaf spring 60 has one end 61 thereof secured to the wall 32 while a lug or protuberance 62 on the free end thereof engages the right end 63 of the shaft 43 to urge the latter to the left, as viewed in Fig. 2, to maintain the portion 57 and the periphery 58 in frictional contact. Thus the drum 26 is held in driving engagement with the shaft 43, and the latter serves, to support the drum so that the horizontal axis thereof will be maintained in registry with the sound aperture 29 and the film positioned the proper distance from the sound objective-lens 40. A protuberance or lug 64 formed on the cover 65 of the magazine 13 engages the left face 66 of the drum 26 and cooperates with the shaft 43 to support the drum. In order to prevent fogging of the film strip F, a suitable light lock must necessarily be provided for the opening 55. In the embodiment shown in Fig. 2, such a light lock is provided by forming an annular flange or collar 67 around the opening 55. This flange is arranged to extend into a registering annular recess 68 formed in the drum 26, as clearly shown in Fig. 2.

By means of this arrangement, the shaft 43 and the stabilizer 42 are operatively connected to and driven by the drum 26. Therefore, any slight momentary variations in the speed of the drum 26, for the reasons pointed out above, will be immediately dampened or filtered out by the stabilizer 42 thus insuring a smooth uniform speed of the drum 26. In addition, the film strip will be accurately positioned relative to the lens 40. With the speed and position of the film strip thus precisely maintained, the strip will accurately record the sound image which passes through the slit 37.

When the magazine 13 is not in the camera housing 11, the spring 60 slides the shaft 43 leftwardly in the bearings 44, as viewed in Fig. 2, until the hub 46a engages the left-hand bearing 44 to limit further leftward movement of the shaft 43. The shaft remains in this shifted position as long as the housing 11 contains no magazine 13. However, when the magazine is placed in the camera housing, the opening 59 of the drum 26 is brought into registry with the shaft 43. The magazine is now slid into position to bring the periphery 58 of the opening 59 into engagement with the tapered portion 57 of the shaft 43. The latter is then slid axially to the right in the bearings 44 until the parts are in the position shown in Fig. 2, and a friction driving engagement is provided between a drum 26 and a shaft 43.

A modified driving connection between the drum 26 and the shaft 43 is shown in Fig. 3. Parts in this modification which correspond to those in Fig. 2 are designated by the same numerals and need not be further described. In this modification, the shaft 43 is the same diameter for its full length and extends into a cylindrical opening 75 formed in the drum 26. The opening 75 may be of such a size as to slidably receive the the shaft 43 to provide a slight driving connection therewith. It is preferred, however, to provide an additional means in the form of a friction clutch, generally indicated by the numeral 74, for operatively connecting the drum 26 in driving engagement with the shaft 43.

To secure this result, the drum 26 is formed with a reduced portion or collar 76 which extends through an opening 77 in the side wall 78 of the magazine 13. The outer end of the collar 76 is formed to provide a radially extending disk 79 which registers with a similar disk 80 rigidly secured to the shaft 43. One or both of the disks 79 and 80 are provided with a facing 81 of cork or other suitable material to provide a friction clutch drive between the two disks 79 and 80 so that the stabilizer 42 may be operatively connected to the drum 26 to control the speed of the latter. In order to provide suitable space for the friction clutch 74, the wall 31 of the chamber 30 and the adjacent sides 78 of the magazine 13 are bent out as shown in Fig. 3.

In order to assemble the drum 26 in the magazine 13, the opening 77 in the side 78 must be slightly larger than the drum to permit the latter to be passed therethrough and into the magazine, as is apparent from an inspection of Fig. 3. This large opening is closed, in the present embodiment, by means of a pair of oppositely arranged U-shaped members 82, of the shape best shown in Fig. 5. These members are slid towards each other from opposite sides of the collar 76 so that the curved portions 83 thereof engage the collar, while the members themselves are arranged in overlapping relation, as shown in Fig. 3, to effectively cover the opening 77 to provide a light lock therefor.

A leaf spring 84 has one end 85 thereof secured to the outer surface 86 of the side 32 while the intermediate portion is formed with a lug or protuberance 87 which engages the end 88 of the shaft 43 to move the latter to the left, as viewed in Fig. 3, to yieldably maintain the members of the friction clutch 74 in driving engagement. A Z-shaped lug 89 is secured to the surface 86 of the wall 32 and is arranged in the path of the free end 90 of the spring 84 to limit the rightward movement thereof, as viewed in Fig. 3, when a magazine is placed in the housing, in the manner described in connection with Fig. 2.

The embodiment in Fig. 3, thus affords a friction clutch which operatively connects the stabilizer 42 in driving engagement with the sound drum 26 so as to filter out any slight variations in the speed of the drum. The shaft 43 also cooperates with the protuberance 64 on the magazine cover 65 to support the drum 26 in proper position relative to the sound aperture 29 and the lens 40.

Fig. 4 shows still another arrangement for forming a driving connection between the stabilizer 42 and the sound drum. The parts corresponding to those in the other figures will be designated by the same numerals. As the sound drum in this embodiment is of a slightly different shape than those described, it will be designated by the numeral 26a. This drum is formed with a large central opening 94 in which is press fitted a sleeve or bushing 95. The right hand end of the opening 94 is countersunk to provide an annular recess 96 arranged to receive the annular flange 67 to provide a light lock for the opening 55 in the side 56 of the magazine, as described in connection with Fig. 2 above.

The right end of the bushing 95 is formed with an annular rib or flange 97 the face of which is formed with a row of axially extending teeth 98 which are arranged to engage with a corresponding row of teeth 99 which project axially from a flange 100 formed on the left end of the shaft 43, Fig. 4. Thus when a magazine is in position in the camera housing, the teeth 98 and 99 engage to provide a positive driving connection between the stabilizer 42 and its shaft 43 and a sound drum 26a. The left end of the bushing 95 is formed with a countersunk recess 101 in which is positioned a ball 102. This ball engages a flat spring washer 103 secured to the inner surface 104 of the magazine cover 65 to yieldably urge the sound drum 26a, with its bushing 95, to the right, as viewed in Fig. 5. The right end of the shaft 43 is supported in a ball thrust bearing 105 which is mounted in the wall 32, as shown. The drum 26a is thus resiliently moved toward the shaft 43 to bring the teeth 98 and 99 into engaging relation to positively connect or clutch the drum to the shaft 43 and the stabilizer 42 so that the latter may control the speed of the film strip past the sound aperture, as above described. As the bushing 95 is tightly fitted within the drum 26a it, in effect, is a part thereof so that the teeth 98 may be broadly considered as formed on the sound drum.

In all of the above arrangements, the sound drum is suitably clutched to the shaft which carries the stabilizer so that the latter is operatively connected to the drum. By means of such a connection, the stabilizer is effective to quickly and automatically dampen out any slight momentary speed variations in the sound drum, which variations may result from slight imperfections in the film strip, or imperfections or eccentricities in the various driving members. Thus a smooth uniform sound drum speed is insured. In addition, the stabilizer shaft accurately positions the film strip relative to the sound objective lens, thus assuring true sound recording, the advantages of which are obvious.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. In a motion picture camera, the combination with a film magazine placeable within said camera, means for moving a film strip through said magazine and past exposure and sound apertures formed therein, a sound drum positioned within said magazine adjacent said sound aperture and arranged in a loop of said strip to be driven solely thereby, of means on said camera directly engaging said drum and cooperating with said magazine for supporting said drum in alignment with said sound aperture, and a mechanical filter on said supporting means and actuated solely by the movement of said film strip over said drum for maintaining a uniform film speed at said sound aperture.

2. In a motion picture camera, the combination with a film magazine placeable within said camera, means for moving a film strip through said magazine and past exposure and sound apertures formed therein, a sound drum positioned within said magazine adjacent said sound aperture and arranged in a loop of said strip to be driven thereby, of means including a shaft mounted on said camera and engaging said drum to support the latter in registry with said sound aperture, means for maintaining said shaft in engagement with said drum, and means on said shaft for filtering out any speed variations of said drum.

3. In a motion picture camera, the combination with a film magazine placeable within said camera, means for moving a film strip through said magazine and past exposure and sound apertures formed therein, a sound drum positioned within said magazine adjacent said sound aperture and arranged in a loop of said film, a sound lens adjacent said sound aperture, of means including a shaft slidably mounted on said camera and arranged to engage said drum to support said drum in registry with said sound aperture and to maintain said drum at a fixed distance from said lens, and means for yieldably maintaining said shaft in engagement with said drum.

4. In a motion picture camera, the combination with a film magazine placeable within said camera, means for moving a film strip through said magazine and past exposure and sound apertures formed therein, a sound drum positioned within said magazine adjacent said sound aperture and arranged in a loop of said film so as to be driven solely thereby, a sound lens adjacent said sound aperture, of means on said camera detachably engaging said drum for supporting the latter in registry with said sound aperture, means on said supporting means and actuated solely by the movement of the film strip over said drum for maintaining a uniform film speed at said sound aperture, means releasably engaging said drum to retain the film strip thereon a fixed distance from said lens, and means for yieldably retaining said drum engaging means in operative relation with said drum.

5. In a motion picture camera, the combination with a film magazine placeable within said camera, means for moving a film strip through said magazine and past exposure and sound apertures formed therein, a sound drum positioned within said magazine adjacent said sound aperture and arranged in a loop of said strip to be driven thereby, of means on said magazine for supporting one end of said drum, means on said camera arranged to frictionally engage a central opening in said drum and cooperating with said supporting means for maintaining said drum in registration with said sound aperture, and a flywheel on said drum engaging means and driven solely by the movement of the film strip over said drum for maintaining said drum at a uniform speed.

6. In a motion picture camera, the combination with a film magazine placeable within said camera, means for moving a film strip through said magazine and past exposure and sound apertures formed therein, a sound drum positioned within said magazine adjacent said sound aperture and arranged in a loop of said strip to be driven thereby, of means on said magazine for supporting one end of said drum, an axially movable shaft mounted on said camera, said shaft having a portion thereof extending into and engaging said drum and cooperating with said last mentioned means for maintaining said drum in registry with said sound aperture, resilient means for moving said shaft axially to maintain said portion in engagement with said drum, and a mechanical filter on said shaft for maintaining a uniform drum and film speed at said sound aperture.

7. In a motion picture camera, the combination with a film magazine placeable within said camera, means for moving a film strip through said magazine and past exposure and sound apertures formed therein, a sound drum positioned within said magazine adjacent said sound aperture and arranged in a loop of said strip to be driven thereby, a sound lens adjacent said sound aperture, of means on said magazine for supporting one end of said drum at the axis thereof, a shaft slidably mounted on said camera in alignment with said drum axis, said shaft having a portion thereof arranged to extend through said magazine and into an axially formed opening in said drum, means for operatively connecting said drum to said shaft, said connecting means cooperating with said supporting means for maintaining an axis of said drum in registry with said sound aperture and for retaining said drum a fixed distance from said lens, a leaf spring mounted on said camera and engaging said shaft to move the latter axially to engage said connecting means, and a flywheel carried by said shaft for assuring a uniform speed of said film strip as the latter passes said sound aperture.

8. In a motion picture camera, the combination with a film magazine placeable within said camera, means for moving a film strip through said magazine and past exposure and sound apertures formed therein, a sound drum positioned within said magazine adjacent said sound aperture and arranged in a loop of said strip to be driven thereby, of means on said magazine for supporting one end of said drum at the axis thereof, a shaft slidably mounted on said camera in alignment with said drum axis, said shaft having a portion thereof arranged to extend through said magazine and into an axially formed opening in said drum, means for operatively connecting said drum to said shaft, said connecting means cooperating with said supporting means for maintaining the axis of said drum in registry with said sound aperture, a leaf spring mounted on said camera and engaging said shaft to move the latter axially to engage said connecting means, cooperating means on said magazine and said drum for affording a light lock adjacent said shaft, and a viscous flywheel carried by said shaft for maintaining a uniform speed of said film strip as the latter passes said sound aperture.

9. In a motion picture camera, the combination with a film magazine placeable within said camera, means for moving a film strip through said magazine and past exposure and sound apertures formed therein, a sound drum positioned within said magazine adjacent said sound aperture and arranged in a loop of said strip to be driven thereby, of a shaft rotatably and slidably mounted in said camera, said drum being formed with an axially extending opening, a portion of said shaft extending through an aperture formed in said magazine and into said opening and engaging the periphery thereof to support said drum and to maintain the axis thereof in registry with said sound aperture, means for frictionally connecting said drum to said shaft so that the latter may be driven upon rotation of said drum, means for maintaining said friction connecting means in engagement, and a flywheel on said shaft for maintaining a uniform film speed as the film strip passes said sound aperture.

10. In a motion picture camera, the combination with a film magazine placeable within said camera, means for moving a film strip through said magazine and past exposure and sound apertures formed therein, a sound drum positioned within said magazine adjacent said sound aperture and arranged in a loop of said strip to be driven thereby, of means on said magazine for supporting one end of said drum at the axis thereof, a shaft rotatably and slidably mounted on said camera and in alignment with said drum supporting means, said drum being formed with an axially extending tapered opening in alignment with said shaft, a tapered portion on said shaft arranged to extend into said opening and to engage the periphery thereof to frictionally connect said drum to said shaft to drive the latter from said drum, a leaf spring mounted on said camera and engaging said shaft to move the latter axially to maintain said portion in frictional engagement with said periphery, an annular rim in said magazine concentric with said shaft and extending into a cooperating annular recess formed in said drum to afford a light lock for said magazine, and a flywheel carried by said shaft for maintaining a uniform speed on said film strip as the latter passes said sound aperture.

11. In a motion picture camera, the combination with a film magazine placeable within said camera, means for moving a film strip through said magazine and past exposure and sound apertures formed therein, a sound drum positioned within said magazine adjacent said sound aperture and arranged in a loop of said strip to be driven thereby, of means on said magazine for supporting one end of said drum at the axis thereof, a collar on the other end of said drum extending through an aperture in said magazine, said collar and drum being formed with an axially extending opening in alignment with said drum supporting means, a shaft rotatably and slidably mounted on said camera, a portion of said shaft arranged to extend into said opening and cooperating with said supporting means to support said drum to maintain the axis thereof in registry with said sound aperture, friction clutch members carried by said shaft and said collar for operatively connecting said shaft to said drum, a leaf spring in said camera engaging said shaft to hold said clutch members in driving engagement so that said shaft may be driven by said drum, a pair of U-shaped discs arranged in overlapping relation over said aperture to afford a light lock therefor, and a flywheel on said shaft for controlling the speed of said drum to maintain said film strip at a constant speed as it passes said sound aperture.

12. In a motion picture camera, the combination with a film magazine placeable within said camera, means for moving a film strip through said magazine and past exposure and sound apertures formed therein, a sound drum positioned within said magazine adjacent said sound aperture and arranged in a loop of said strip to be driven thereby, of a flat spring mounted on said housing, said drum being formed with an axially opening extending therethrough, a ball positioned in one end of said opening and engaging said spring to provide a point support for one end of said drum, said drum being formed with an annular recess adjacent and concentric with said opening, an annular flange on said magazine extending into said recess to afford a light lock, an annular row of teeth formed on the other end of said drum, a shaft rotatably and slidably mounted in said camera, an annular row of teeth formed on one end of said shaft and arranged to cooperate with the teeth on said drum to clutch the latter to said shaft so that said drum may drive said shaft, and a flywheel carried by said shaft for automatically controlling the speed of said drum to insure a uniform film speed as the latter passes said sound aperture.

WILLIAM E. MERRIMAN.